(12) United States Patent
Landry et al.

(10) Patent No.: US 7,493,086 B2
(45) Date of Patent: Feb. 17, 2009

(54) METHODS OF ATTRIBUTE COLLECTION FOR MAPPING

(76) Inventors: Benjamine Joel Landry, 2827 Peterson Pl., Norcross, GA (US) 30071; James Francis Kelly, 2237 Old Brooke La., Dunwoody, GA (US) 30338

( * ) Notice: Subject to any disclaimer, the term of this patent is extended or adjusted under 35 U.S.C. 154(b) by 380 days.

(21) Appl. No.: 10/968,650

(22) Filed: Oct. 19, 2004

(65) Prior Publication Data

US 2006/0084385 A1    Apr. 20, 2006

(51) Int. Cl.
   *H04B 7/00* (2006.01)
(52) U.S. Cl. .............. 455/41.3; 455/563; 455/566; 455/404.2; 455/456.1; 455/41.2; 342/386; 342/357.09; 342/357.08; 342/357.1; 342/36; 342/28
(58) Field of Classification Search .............. 455/563, 455/564, 41.3, 566, 445; 342/28
   See application file for complete search history.

(56) References Cited

U.S. PATENT DOCUMENTS

| | | | | |
|---|---|---|---|---|
| 4,502,123 A | * | 2/1985 | Minami et al. | 701/208 |
| 5,126,748 A | * | 6/1992 | Ames et al. | 342/353 |
| 5,554,990 A | * | 9/1996 | McKinney | 342/36 |
| 5,767,953 A | * | 6/1998 | McEwan | 356/5.01 |
| 5,963,875 A | * | 10/1999 | Go | 455/564 |
| 5,983,100 A | * | 11/1999 | Johansson et al. | 455/426.1 |
| 6,021,335 A | * | 2/2000 | Zicker et al. | 455/564 |
| 6,098,048 A | * | 8/2000 | Dashefsky et al. | 705/10 |
| 6,218,979 B1 | * | 4/2001 | Barnes et al. | 342/28 |
| 6,370,475 B1 | * | 4/2002 | Breed et al. | 701/301 |
| 6,393,346 B1 | * | 5/2002 | Keith et al. | 701/35 |
| 6,526,352 B1 | * | 2/2003 | Breed et al. | 701/213 |
| 6,559,657 B1 | * | 5/2003 | McCarthy et al. | 324/642 |
| 6,720,920 B2 | * | 4/2004 | Breed et al. | 342/386 |
| 6,879,836 B2 | * | 4/2005 | Nakamoto et al. | 455/456.2 |
| 6,895,356 B2 | * | 5/2005 | Brimhall et al. | 702/150 |
| 6,999,779 B1 | * | 2/2006 | Hashimoto | 455/456.2 |
| 7,026,983 B2 | * | 4/2006 | Spratt | 342/357.09 |
| 7,050,786 B2 | * | 5/2006 | Caci | 455/404.2 |
| 7,065,370 B2 | * | 6/2006 | Ogaki et al. | 455/457 |
| 7,091,852 B2 | * | 8/2006 | Mason et al. | 340/539.13 |
| 7,253,766 B2 | * | 8/2007 | Foote et al. | 342/22 |
| 7,292,935 B2 | * | 11/2007 | Yoon | 701/209 |

* cited by examiner

*Primary Examiner*—Marceau Milord
(74) *Attorney, Agent, or Firm*—Nixon & Vanderhye, P.C.

(57) ABSTRACT

This invention integrates a novel technique for mappers to efficiently collect attributes utilizing various wireless systems such as bluetooth. The wireless technique in the data-gathering device allows the flag-man/data gatherer to input useful information into the device, which can readily be available to the mapper at the other end. This invention makes the traditional mapping technique much more efficient and reliable. Due to the ability to exchange data promptly, it nearly diminishes the room for discrepancies. This device overcomes mainly two deficiencies in current mapping device: the need to use a wire to connect data recording device to a data-collecting device, and the need to use some form of oral communication to relay the attributes of the data being collected. This proves to be very efficient by cutting down the investigation data collection time to nearly half, especially at the times when there is heavy traffic and the accident needs to be cleared up as quickly as possible.

15 Claims, 2 Drawing Sheets

METHODS OF ATTRIBUTE COLLECTION FOR MAPPING

BACKGROUND

1. Field of Endeavor

The present invention pertains generally to mapping equipment, and more particularly to the utilization of equipment used for the gathering, transformation and tecording of position and attributes data about selected points of interest in a more efficient way.

2. Related Art

Accident and other area mapping involve an equipment operator and a target positioning person or flag-person. The equipment operator aims distance and angle measuring equipment 10 at a point of interest, selects various attributes about that point and causes the equipment to store the raw or computed positional information for this point along with the attributes about this point in a data collection device 30. The flag-person moves the target or flag 40 to each new point of interest. The flag person does not "operate" any equipment, just moves the flag 40 to the next point of interest. As the flag-person is closer to the point of interest, the flag-person must often convey to the equipment operator what attributes need to be entered inot the data collector device 30 for the select point of interest or target.

Currently the equipment operator aims the distance and angle measuring equipment 10 at the target or flag 40 to obtain and store the raw range and angle position information that may later be converted into X, Y, Z position data or the X, Y, Z data may be computed before being stored on the data collector 30. The distance measurement equipment 10 includes but is not limited to laser distance measuring use various equipment. The data collector 30 may just store the information or may give a graphical representation or map of the data in 2 or 3 dimensions.

BRIEF SUMMARY OF THE INVENTION

The principle object of the present invention is more efficient attribute collection technique for accident and area mappers. This is accomplished by expanding the capabilities of the various wireless techniques, such as bluetooth, and reorganizing the duties of the equipment operator and flag-person. This is achieved by using the same basic wireless technique, configured for slightly longer ranges in the data-gathering device and/or the position gathering equipment. For example current wire replacement bluetooth devices only range to about 30 feet, yet by incorporating a more powerful bluetooth device, the range can be extended to 300 feet. This allows the flag-person to posses the data collection device and thus enters the attribute data without having to coordinate with the distance and angle gathering equipment operator. The angle and equipment operator need only fire the equipment on demand of the flag-person to transmit the positional information to the data collector.

DETAILED DESCRIPTION OF THE INVENTION

Figure 1:
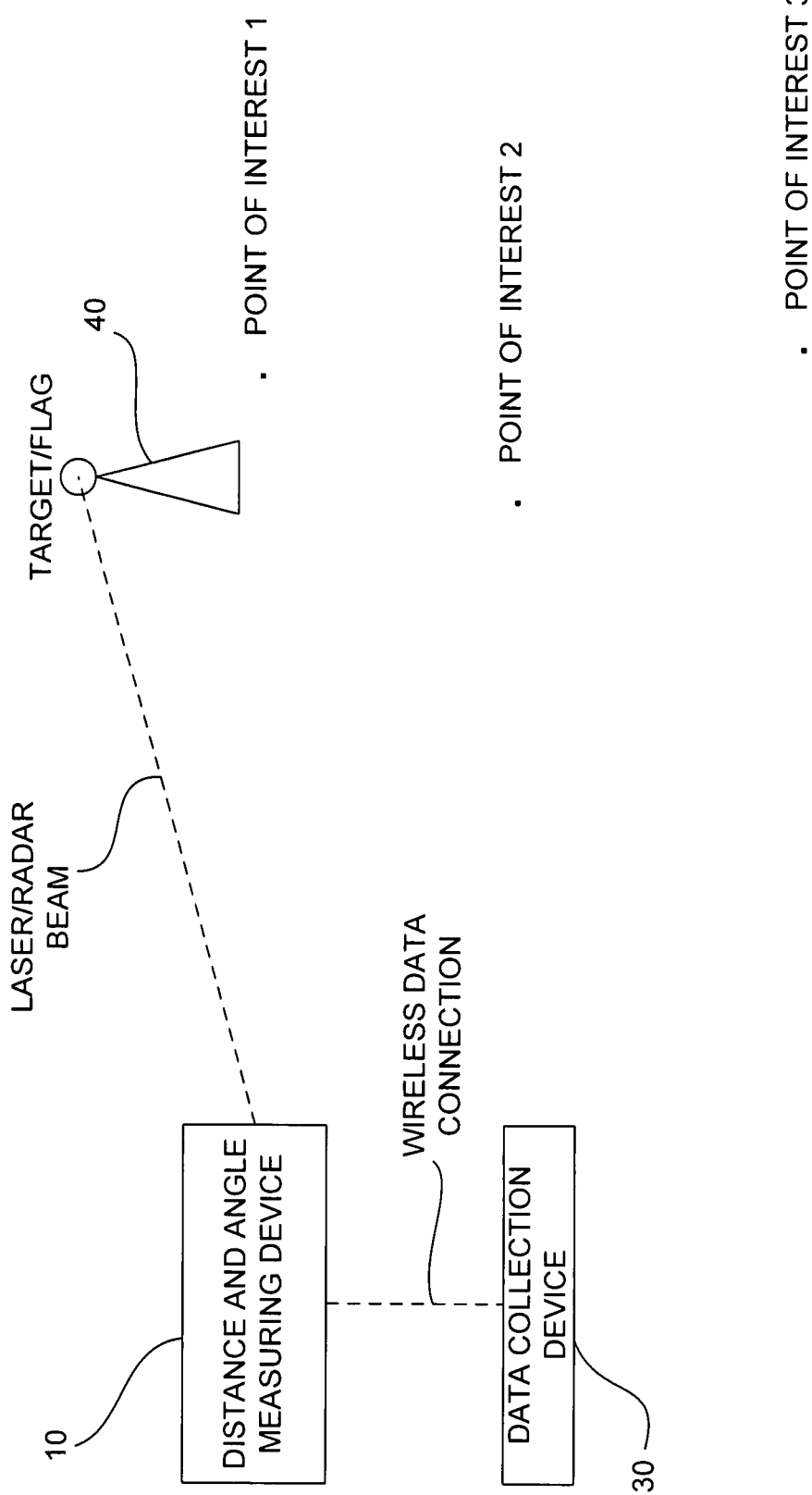
FIG. 1 shows a related art mapping and data collection system.
Figure 2:
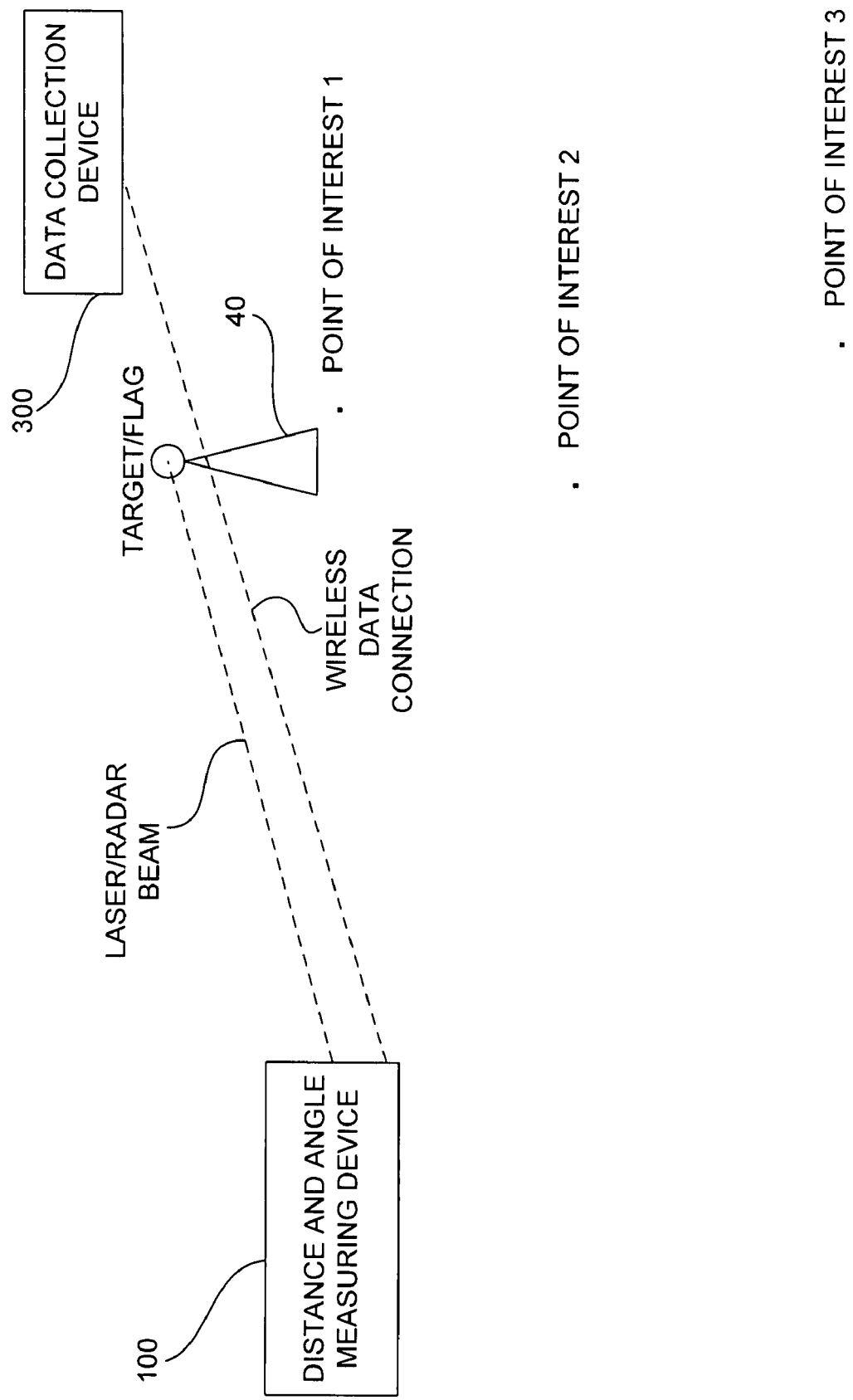
FIG. 2 shows a mapping and data collection system embodying the invention.

The main objective of this invention is to make the data gathering proess for the mappers much more efficient. This can be achieved by incorporating wireless technology such as Bluetooth into the device that is used by mappers to gather useful data. This technology can be planted in the device such that when the flag-man/data gatherer is collecting the data, he/she can make the mapper aware of the conditions existing (for example: presence of a pot-hole, ground-elevation, etc.) at the data collection point.

Before this technology, mappers needed to constantly depend on the falg-person to provide attributes of the point being analyzed to the equipment operator. Which means that every time the point changed, the mapper had to wait until he/she got the required information for the point being analyzed before moving on the next point. As a result, the data gathering time was considerably long. This technology can make the process of data-collection much more efficient than the traditional way. It can nearly cut down the data gathering time in half.

This technology can also be used for the advantage of police officers investigating a crime/accident scene. Before this invention, the police office with the data-collecting device attached to the data recording device at one end would have to communicate via radio or through some other form of communication device to communicate with the officer at the other end marking the different points of the incident being analyzed. Thus, before the office could collect the next data, he would have to wait for the other officer at the opposite end to relay to him information on what the next point is (i.e. is it vehicle no. 1 that he is marking? Is it a curb? Is there a pot-hole present? etc.). With the use of this invention the office at the marking end can do this same data collecting process by simply adding the attributes on his end eliminating the need for relaying the attributes to the other office and then waiting on him to input the information before collecting the next data point. Due to this reduction in the need for oral communication, the whole mapping process can be done in nearly half the time it took before the use of this device. Such improvements in efficiency can prove especially beneficial at times when there is heavy traffic and the officers have to clear out the roads that have been blocked in an accident.

We claim:

1. A method of collecting mapping data, comprising:

positioning a target at a first point of interest;

operating a measuring device at a reference position which is spaced from the first point of interest to determine a distance from the reference position to the target located at the first point of interest, wherein the operating step comprises:

firing a pulse of laser radiation from the measuring device at the target, detecting a portion of the pulse of laser radiation that is reflected from the target back to the measuring device, determining a time of flight for the reflected portion of the pulse of laser radiation, and determining a distance between the measuring device and the target based on the determined time of flight;

recording information about the first point of interest with a data collection device that is located at the first point of interest; and recording the determined distance in the data collection device.

2. The method of claim 1, wherein the step of recording the determined distance comprises wirelessly transmitting the determined distance from the measuring device to the data collection device.

3. The method of claim 1, further comprising:
  determining an azimuth angle of a line passing from the measuring device to the target; and
  recording the azimuth angle in the data collection device.

4. The method of claim 3, wherein the step of recording the azimuth angle comprises wirelessly transmitting the azimuth angle from the measuring device to the data collection device.

5. The method of claim 1, further comprising:
  determining an inclination angle of a line passing from the measuring device to the target; and
  recording the inclination angle in the data collection device.

6. The method of claim 5, wherein the step of recording the inclination angle comprises wirelessly transmitting the inclination angle from the measuring device to the data collection device.

7. The method of claim 1, further comprising:
  operating the measuring device located at the reference position to determine a distance between the reference position and a target located at a second point of interest;
  recording information about the second point of interest with a data collection device that is located at the second point of interest; and
  recording the determined distance between the reference position and the target at the second point of interest in the data collection device.

8. A method of collecting mapping data, comprising:
  operating a measuring device located at a reference position to determine a distance between the reference position and a first point of interest that is spaced from the reference position, wherein the operating step comprises:
    firing a pulse of laser radiation from the measuring device at a target located at the first point of interest,
    detecting a portion of the pulse of laser radiation that is reflected from the target back to the measuring device,
    determining a time of flight for the reflected portion of the pulse of laser radiation, and
    determining a distance between the measuring device and the target based on the determined time of flight;
  recording information about the first point of interest with a data collection device that is located at the first point of interest; and
  recording the determined distance in the data collection device.

9. The method of claim 8, wherein the step of recording the determined distance comprises wirelessly transmitting the determined distance from the measuring device to the data collection device.

10. The method of claim 9, further comprising:
  determining an azimuth angle of a line passing from the measuring device to the first point of interest; and
  recording the azimuth angle in the data collection device.

11. The method of claim 10, wherein the step of recording the azimuth angle comprises wirelessly transmitting the azimuth angle from the measuring device to the data collection device.

12. The method of claim 10, further comprising:
  determining an inclination angle of a line passing from the measuring device to the first point of interest; and
  recording the inclination angle in the data collection device.

13. The method of claim 12, wherein the step of recording the inclination angle comprises wirelessly transmitting the inclination angle from the measuring device to the data collection device.

14. The method of claim 8, further comprising:
  operating the measuring device located at the reference position to determine a distance between the reference position and a second point of interest;
  recording information about the second point of interest with a data collection device that is located at the second point of interest; and
  recording the determined distance between the reference position and the second point of interest in the data collection device.

15. The method of claim 14, wherein the step of recording the determined distance between the reference position and the second point of interest comprises wirelessly transmitting the distance from the measuring device to the data collection device.

* * * * *